(12) United States Patent
Herrera et al.

(10) Patent No.: US 11,425,036 B1
(45) Date of Patent: Aug. 23, 2022

(54) PIPELINED MATCH-ACTION CIRCUITRY

(71) Applicant: Xilinx, Inc., San Jose, CA (US)

(72) Inventors: Jaime Herrera, Dublin (IE); Gordon J. Brebner, Monte Sereno, CA (US); Ian McBryan, Dublin (IE); Rowan Lyons, Dublin (IE)

(73) Assignee: XILINX, INC., San Jose, CA (US)

( * ) Notice: Subject to any disclaimer, the term of this patent is extended or adjusted under 35 U.S.C. 154(b) by 522 days.

(21) Appl. No.: 16/386,127

(22) Filed: Apr. 16, 2019

(51) Int. Cl.
*H04L 45/74* (2022.01)
*H04L 69/22* (2022.01)
*H04L 47/56* (2022.01)
*H04L 45/24* (2022.01)

(52) U.S. Cl.
CPC .............. *H04L 45/74* (2013.01); *H04L 45/24* (2013.01); *H04L 47/56* (2013.01); *H04L 69/22* (2013.01)

(58) Field of Classification Search
None
See application file for complete search history.

(56) References Cited

U.S. PATENT DOCUMENTS

| 9,712,439 | B2 | 7/2017 | Bosshart | |
|---|---|---|---|---|
| 10,075,567 | B1 * | 9/2018 | Licking | H04L 69/22 |
| 10,104,004 | B2 * | 10/2018 | Bosshart | H04L 49/3063 |
| 10,616,101 | B1 * | 4/2020 | Peterson | H04L 47/12 |
| 2014/0241361 | A1 | 8/2014 | Bosshart | |
| 2014/0334489 | A1 | 11/2014 | Bosshart | |

OTHER PUBLICATIONS

Pontarelli, Smashing SDN "built-in" actions: programmable data plane packet manipulation in hardware, IEEE, 978-1-5090-6008-5/17.
Kekely, Mapping of P4 Match Action Tables to FPGA, 27th International Conference on Field Programmable Logic and Applications (FPL) Oct. 5, 2017.
Bosshart, Forwarding Metamorphosis: Fast Programmable Match-Action Processing in Hardware for SDN, SIGCOMM'13, Aug. 12-16, 2013, ACM 978-1-4503-2056-6/13/08.
U.S. Appl. No. 16/242,860, filed Jan. 8, 2019, San Jose, CA USA.
U.S. Appl. No. 16/242,876, filed Jan. 8, 2019, San Jose, CA USA.

* cited by examiner

*Primary Examiner* — Kodzovi Acolatse
(74) *Attorney, Agent, or Firm* — Crawford Maunu PLLC

(57) ABSTRACT

A match-action circuit includes one or more conditional logic circuits, each having an input coupled to input header or metadata of a network packet, and each configured to generate an enable signal as a function of one or more signals of the header or metadata. Each match circuit of one or more match circuits is configured with response values associated with key values. Each match circuit is configured to conditionally lookup response value(s) associated with an input key value from the header or metadata in response to the enable signal from a conditional logic circuit. One or more action circuits are configured to conditionally modify, in response to states of the response value(s) output from the match circuit(s), data of the header or the metadata.

16 Claims, 11 Drawing Sheets

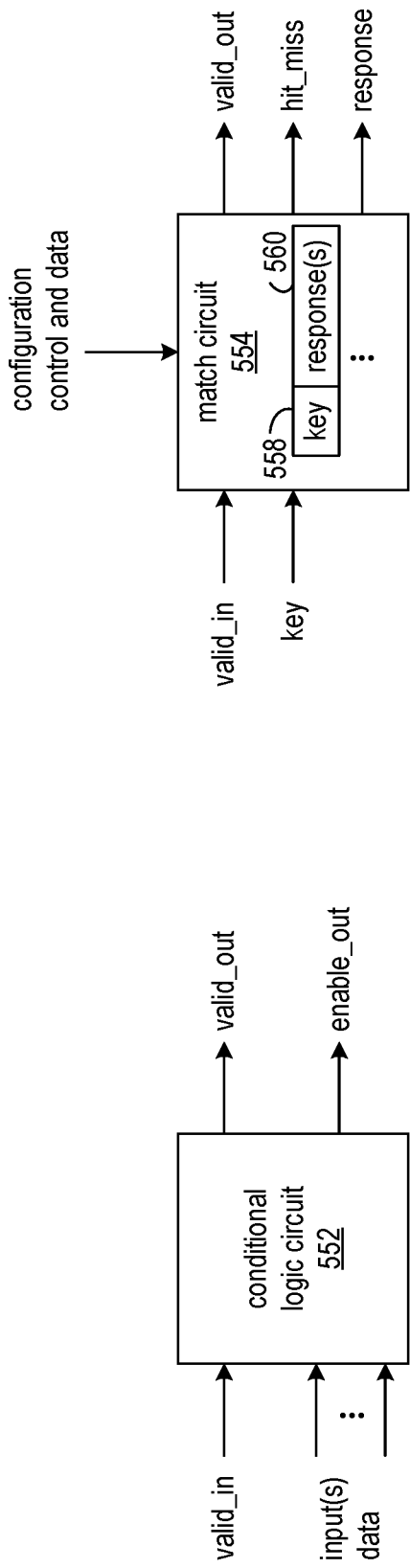
FIG. 7
FIG. 6
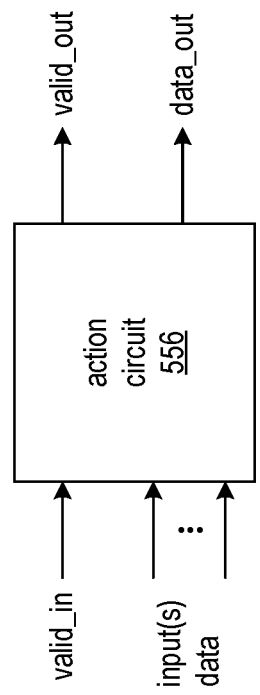
FIG. 8

PIPELINED MATCH-ACTION CIRCUITRY

TECHNICAL FIELD

The disclosure generally relates to match-action circuits.

BACKGROUND

In packet-based network communications a packet can include a stack of headers and metadata and a payload. The headers and metadata can describe the source and destination and the data carried by the packet. The headers in a packet pertinent to the source or destination systems can include a stack of Ethernet, Internet Protocol (IP) and Transmission Control Protocol (TCP) headers, for example.

The headers used by the routing equipment can include a stack of various carrier Ethernet or multiprotocol label switching (MPLS) headers, reflecting enroute encapsulation, for example. Headers and metadata may be changed in transit from the source to the destination.

SUMMARY

According to a disclosed circuit arrangement, an input register is configured for storage of a header and metadata of a network packet. Each conditional logic circuit of one or more conditional logic circuits has a respective input coupled to the input register and has a respective output. Each conditional logic circuit is configured to generate a respective enable signal as a logic function of states of one or more signals from the input register. Each match circuit of one or more match circuits is configured with a respective set of a plurality of key values and associated response values. Each key value has one or more associated response values. Each match circuit is configured to conditionally lookup the one or more response values associated with an input key value from the input register in response to a state of the respective enable signal from one or more of the conditional logic circuits. Each match circuit is further configured to output the one or more response values associated with the input key value. Each action circuit of one or more action circuits coupled to an output register and is coupled to receive one or more response values from the one or more match circuits, and each action circuit is configured to conditionally modify, in response to states of the received one or more response values, data of at least one of the header or the metadata, and to output the modified data for storage in the output register.

A disclosed method include inputting to a design tool executing on a computer processor, a high-level language specification of a match-action processor circuit. The match-action processor circuit includes one or more conditional logic circuits, one or more match circuits and one or more action circuits connected in two or more paths. The design tool determines latencies of the one or more conditional logic circuits, the one or more match circuits and one or more action circuits by the design tool. The design tool determines a path of the two or more paths having a longest latency and determines dependencies between the one or more conditional logic circuits, the one or more match circuits, and the one or more action circuits by the design tool. The design tool assigns the one or more conditional logic circuits, the one or more match circuits, and the one or more action circuits to stages of a pipeline based on the dependencies and the longest latency. Based on assignments to the stages of the pipeline, latencies, and dependencies, the design tool generates a hardware description language specification of the match-action processor circuit.

Another disclosed circuit arrangement includes a match circuit configured with a plurality of key values and associated response values. Each key value has one or more associated response values, and the match circuit is configured to lookup, in response to an input key value from an input register having header and metadata of a network packet, the one or more response values associated with the input key value and to output the one or more response values associated with the input key value. The circuit arrangement further includes a plurality of action circuits coupled to an output register and to the match circuit to receive in parallel the one or more response values associated with the input key value. Each action circuit is configured to conditionally modify, in response to states of the received one or more response values, data of at least one of the header or the metadata, and to output the modified data for storage in an output register.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which:

FIG. 6 shows the input signals to and the output signals from a conditional logic circuit;

FIG. 7 shows the input signals to and the output signals from a match circuit;

FIG. 8 shows the input signals to and the output signals from an action circuit;

DETAILED DESCRIPTION

Figure 1:
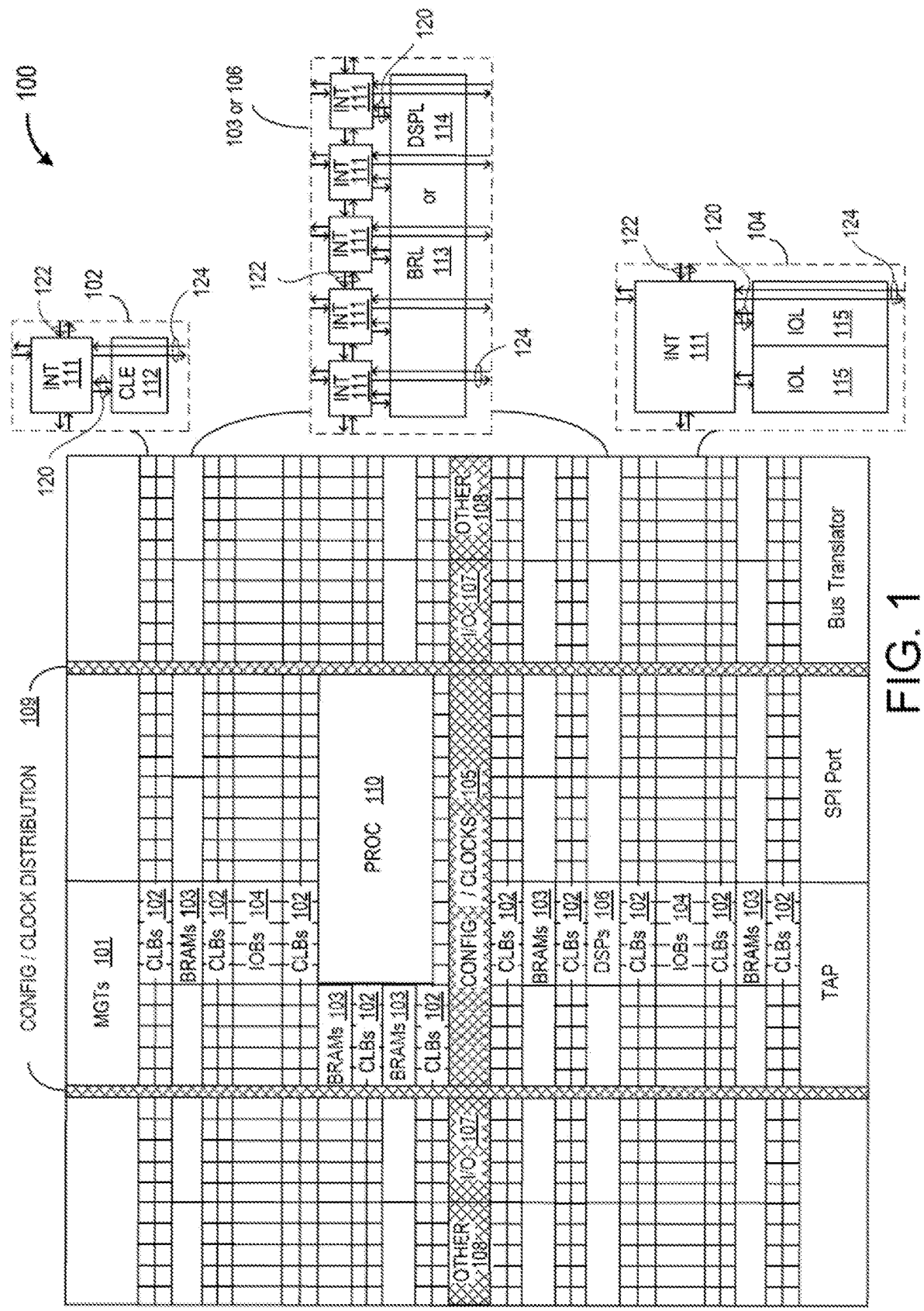
FIG. 1 depicts an exemplary programmable integrated circuit (IC) on which the disclosed circuits and processes may be implemented.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

High-level languages (HLL) for specifying packet processing functions have been developed to enable an abstract specification of the complex packet processing functions performed by routing equipment. One example of an HLL is the P4 packet processing language. The processing model specified by the Portable Switch Architecture involves three stages: parsing, match-action, and deparsing.

In the parsing stage, headers are extracted from the beginning of the packet according to the operations specified in the P4 program. In the match-action stage, headers and metadata can be modified in response to data present in the packet. In the deparsing stage, the packet headers are re-formed into the format of the outbound packet.

The disclosed circuits and methods provided improved approaches for implementing match-action circuits. The match-action circuits can be deployed in combination with the parser and de-parser circuits. The disclosed match-action circuitry has a pipelined structure and the components are arranged to provide an optimal solution for the HLL-specified packet processing. The pipelined structure can reduce pipeline latency, reduce circuit resource requirements, and reduce power consumption.

In one approach, a match-action circuit can include an input register, an output register, one or more conditional logic circuits, one or more match circuits, and one or more action circuits coupled in a pipelined arrangement. The input register is configured for storage of a header and metadata of a network packet. Each conditional logic circuit has a respective input coupled to the input register and is configured to generate a respective enable signal as a logic function of states of one or more signals from the input register.

Each match circuit is configured with a respective set of key values and associated response values. Each key value has one or more associated response values. Each match circuit is configured to conditionally lookup the response value(s) associated with an input key value from the input register in response to a state of the respective enable signal from of the conditional logic circuit(s). Each match circuit outputs the response value(s) associated with the input key value.

Each action circuit receives one or more response values from the match circuit(s). Each action circuit is configured to conditionally modify, in response to states of the received response value(s), data of at least one of the header or the metadata. The modified data is output for storage in the output register.

FIGS. 1-4B show systems in which the improved match-action circuitry can be deployed. FIGS. 5-16 show various details of the match-action circuitry.

FIG. 1 depicts an exemplary programmable integrated circuit (IC) on which the disclosed circuits and processes may be implemented. A programmable IC 100 includes FPGA logic. The programmable IC 100 may be implemented with various programmable resources and may be referred to as a System on Chip (SOC). Various examples of FPGA logic may include several diverse types of programmable logic blocks in an array.

For example, FIG. 1 illustrates a programmable IC 100 that includes a large number of different programmable tiles including multi-gigabit transceivers (MGTs) 101, configurable logic blocks (CLBs) 102, blocks of random access memory (BRAMs) 103, input/output blocks (IOBs) 104, configuration and clocking logic (CONFIG/CLOCKS) 105, digital signal processing blocks (DSPs) 106, specialized input/output blocks (I/O) 107 (e.g., clock ports), and other programmable logic 108 (e.g., digital clock managers, analog-to-digital converters, system monitoring logic). The programmable IC 100 includes dedicated processor blocks (PROC) 110. The programmable IC 100 may include internal and external reconfiguration ports (not shown).

In various examples, a serializer/deserializer may be implemented using the MGTs 101. The MGTs 101 may include various data serializers and deserializers. Data serializers may include various multiplexer implementations. Data deserializers may include various demultiplexer implementations.

In some examples of FPGA logic, each programmable tile includes a programmable interconnect element (INT) 111 having standardized inter-connections 124 to and from a corresponding interconnect element in each adjacent tile. Therefore, the programmable interconnect elements taken together implement the programmable interconnect structure for the illustrated FPGA logic. The programmable interconnect element INT 111 includes the intra-connections 120 to and from the programmable logic element within the same tile, as shown by the examples included in FIG. 1. The programmable interconnect element INT 111 includes the inter-INT-connections 122 to and from the programmable interconnect element INT 111 within the same tile, as shown by the examples included in FIG. 1.

For example, a CLB 102 may include a configurable logic element (CLE) 112 that may be programmed to implement user logic, plus a single programmable interconnect element INT 111. A BRAM 103 may include a BRAM logic element (BRL) 113 and one or more programmable interconnect elements. In some examples, the number of interconnect elements included in a tile may depend on the height of the tile. In the pictured implementation, a BRAM tile has the same height as five CLBs, but other numbers (e.g., four) may also be used. A DSP tile 106 may include a DSP logic element (DSPL) 114 and one or more programmable interconnect elements. An IOB 104 may include, for example, two instances of an input/output logic element (IOL) 115 and one instance of the programmable interconnect element INT 111. The actual I/O bond pads connected, for example, to the I/O logic element 115, may be manufactured using metal layered above the various illustrated logic blocks, and may not be confined to the area of the input/output logic element 115.

In the pictured implementation, a columnar area near the center of the die (shown shaded in FIG. 1) is used for configuration, clock, and other control logic. Horizontal areas 109 extending from the column distribute the clocks and configuration signals across the breadth of the programmable IC 100. Note that the references to "columnar" and "horizontal" areas are relative to viewing the drawing in a portrait orientation.

Some programmable ICs utilizing the architecture illustrated in FIG. 1 may include additional logic blocks that disrupt the regular columnar structure making up a large part of the programmable IC. The additional logic blocks may be programmable blocks and/or dedicated logic. For example, the processor block PROC 110 shown in FIG. 1 spans several columns of CLBs 102 and BRAMs 103.

FIG. 1 illustrates an exemplary programmable IC architecture. The numbers of logic blocks in a column, the relative widths of the columns, the number and order of columns, the types of logic blocks included in the columns, the relative sizes of the logic blocks, and the interconnect/logic implementations are provided purely as examples. For example, in an actual programmable IC, more than one adjacent column of CLBs 102 may be included wherever the CLBs 102 appear, to facilitate the efficient implementation of user logic.

Programmable ICs may be deployed in a range of applications. The programmable logic capabilities of an FPGA may provide significant advantages in applications such as, for example, communications. By way of example, an FPGA may be programmed to process packet-based communications between networked devices. In some implementations, a network device may examine fields in packet headers to decide what to do with each packet. For example, a router may examine the internet protocol (IP) destination address to decide where to send the packet next. A firewall may compare several fields against an access-control list to decide whether to drop a packet. Parsing may include the process of identifying and extracting the appropriate header fields in a packet header. Deparsing may include the process of updating the appropriate header fields and reassembling the packet headers and data payload into an outgoing data packet. In various embodiments described herein, Field programmable gate arrays (FPGAs) may be used to implement a high-speed programmable packet processing.

Figure 2:
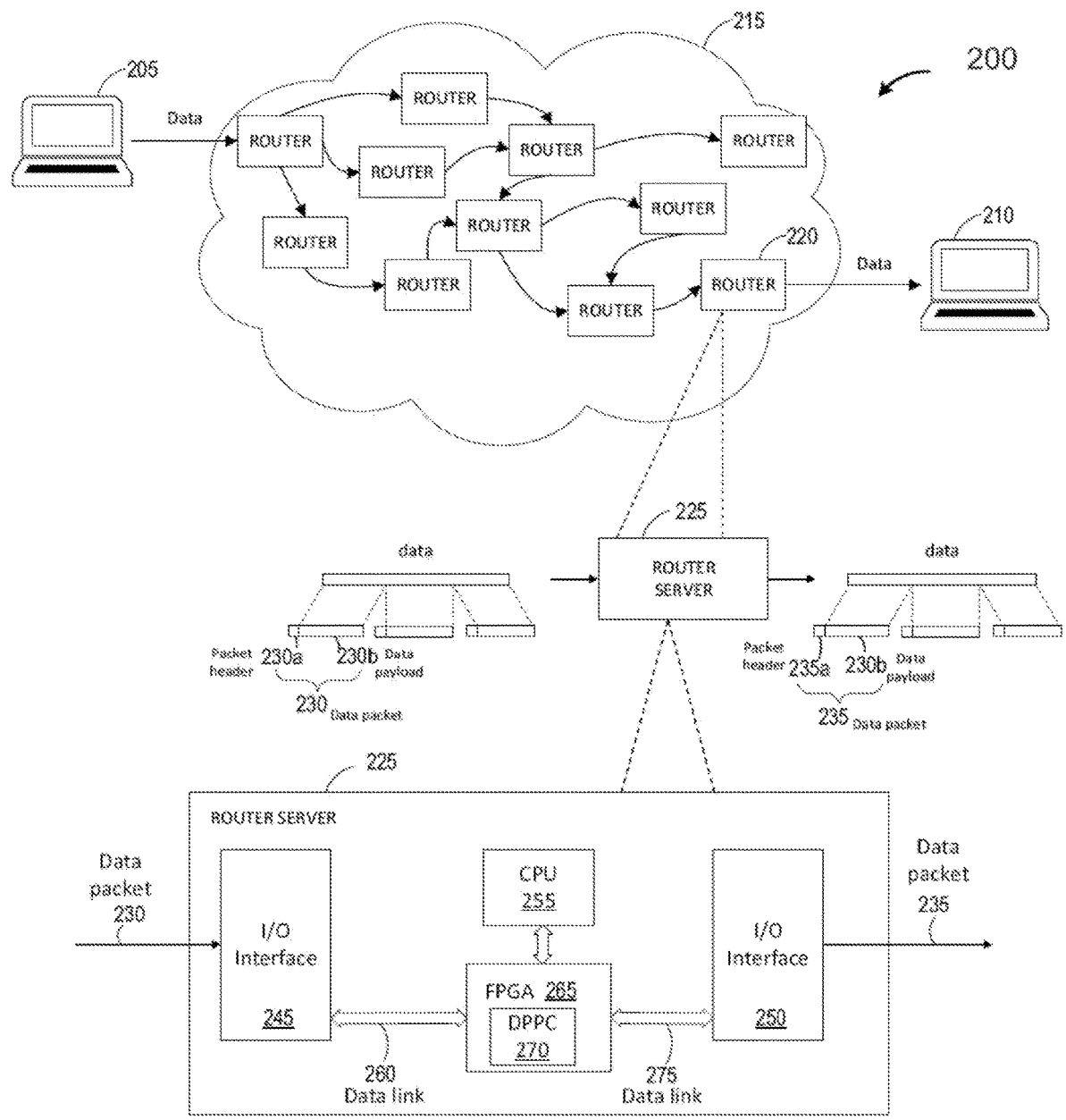
FIG. 2 depicts an exemplary router server implemented in a communication system.

FIG. 2 depicts an exemplary router server 225 implemented in a communication system 200. When data transfers from a first telecommunication device 205 to a second telecommunication device 210, the data are forwarded by a network 215 of interconnected routers 220. The routers 220 are used to forward data packets between the telecommunication devices 205, 210. The router 220 may, for example, read information in the data packet to determine the next destination (e.g., a network address of the second telecommunication device 210). In the depicted example, the router 220 includes a router server 225. The router server 225 may read network address information in the data packet to find the ultimate destination. Data may be divided into data packets to be transferred between different routers. In this depicted example, data is divided into three data packets. Each data packet (e.g., data packet 230) includes a packet header 230a and a data payload 230b. The packet header 230a may be extracted and modified by the router server 225 to send to the next destination. For example, the packet header 230a becomes a new packet header 235a. The new packet header 235a and the data payload 230b forms a new data packet 235.

The router server 225 includes a first I/O interface 245 coupled to receive the incoming data packet 230, and a second I/O interface 250 coupled to output the new data packet 235. The router server 225 further includes a central processing unit (CPU) 255, a data link 260 coupled to transfer data from the I/O interface 245 to an FPGA 265 configured with a Data Packet Processing Circuit (DPPC) 270, and a data link 275 coupled to transfer data from the FPGA 265 to the I/O interface 245. When the data packet 230 is transmitted to the router server 225, the router server 225 accepts the data packet 230 through the first I/O interface 245. The data packet 230 may then be detected by the CPU 255, which may monitor and/or provide control or auxiliary functions in support of the packet processing. In some example, the CPU 255 may offload the packet processing by instructing a field programmable gate array (FPGA) 265 to identify the data packet 230 and perform the processing operations that modify the header 230a into the header 235a. The data packet 230 is then allocated to the FPGA 265, which is configured with the data packet processing circuit (DPPC) 270. The DPPC 270 parses, processes, and deparses the data packet 230 and sends the processed data packet 235 to the second I/O interface 250 to the next destination.

Figure 3:
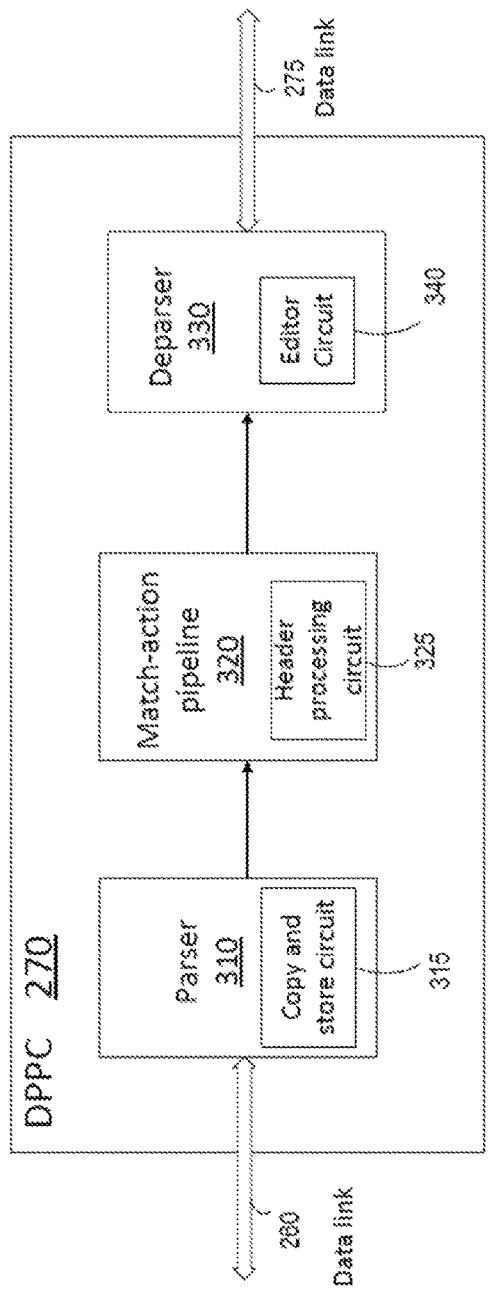
FIG. 3 depicts an exemplary data packet processing circuit (DPPC) implemented in an FPGA of the router server in FIG. 2.

FIG. 3 depicts an exemplary data packet processing circuit (DPPC) implemented in an FPGA of the router server in FIG. 2. A data packet processing circuit (DPPC) (e.g., the DPPC 270 in FIG. 2) includes a parser 310. The parser 310 may accept a data packet (e.g., the data packet 230) and extract header fields information from the data packet (e.g., the data packet 230). In this depicted example, the parser 310 includes a copy and store circuit 315. The copy and store circuit 315 identifies headers to be modified and only copies the identified headers from a data packet (e.g., the data packet 230) without extracting all headers in the data packet. The copied headers are then stored for future processing.

The DPPC 270 also includes a match-action pipeline circuit 320. The match-action pipeline circuit 320 may be configured to receive the copied headers and process those copied headers. In this depicted example, the match-action pipeline circuit 320 includes a header processing circuit 325. The header processing circuit 325 processes the copied headers extracted from the parser circuit 310 and generates new headers. For example, in a packet with headers A, B and C, the header processing circuit 325 may change information contained in header A. In another example, the header processing circuit 325 may also insert two more headers.

The DPPC 270 also includes a deparser 330. The deparser 330 is configured to receive the new headers and re-form the new headers into the data packet (e.g., the data packet 230) to form a new outgoing data packet (e.g., the data packet 235). The deparser 330 includes an editor circuit 340. The editor circuit 340 receives the new headers and may be configured to modify the data packet headers with new headers to form an outgoing data packet (e.g., the data packet 235). In some embodiments, the DPPC 270 may be implemented on a non-programmable logic (e.g., ASIC). In some embodiments, the deparser 330 may be implemented on a nonprogrammable logic (e.g., ASIC). In some embodiments, the editor circuit 340 may be implemented on a non-programmable logic (e.g., ASIC).

Figure 4A:
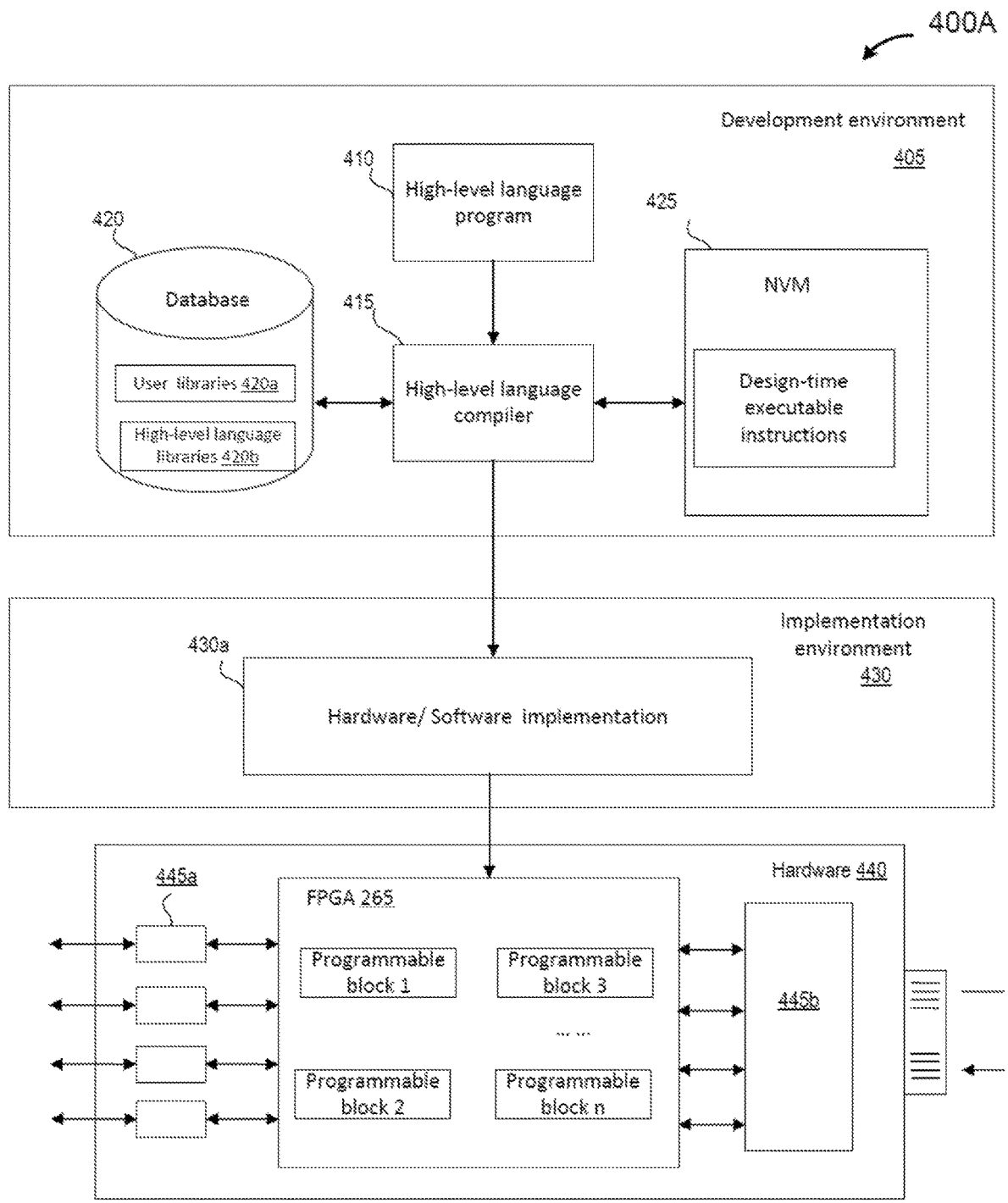
FIG. 4A depicts a generalized system to compile instructions in a high-level language (HLL) to configure, for example, programmable logic blocks.
Figure 4B:
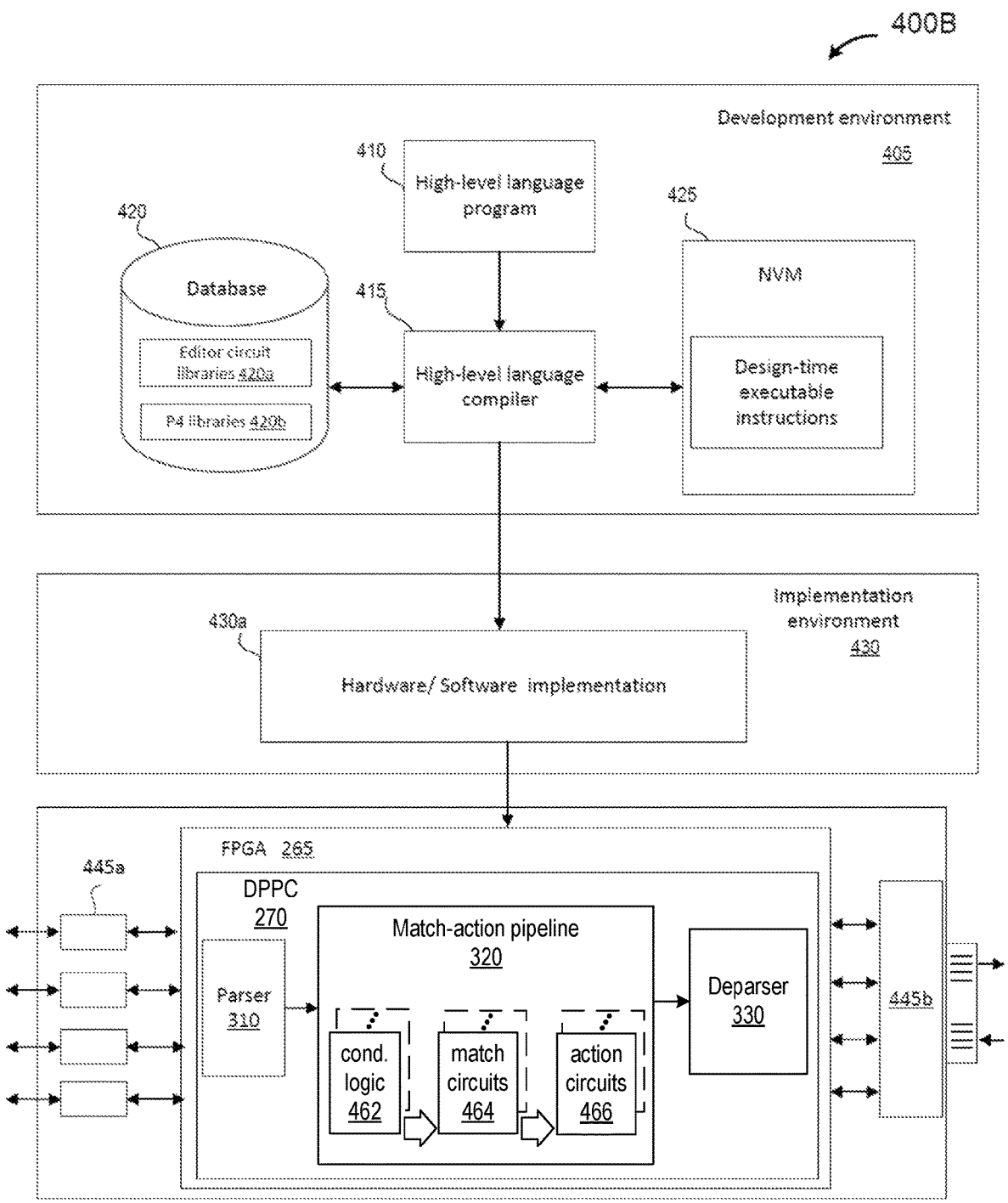
FIG. 4B depicts a particularized system configured to compile match-action instructions as specified in a high-level language to configure circuitry for packet match-action processing.

FIGS. 4A-4B each depict a block diagram of an exemplary system to use a high-level language representation to implement packet processing in a hardware streaming pipeline architecture. Specifically, FIG. 4A depicts a generalized system to compile instructions in a high-level language (HLL) to configure, for example, programmable logic blocks.

A configuration system 400A includes a development environment 405. The development environment 405 includes a user interface for development using a HLL program 410. A user may use a high-level language (HLL) (e.g., P4 language) to generate, at design time, instructions that can produce, via RTL generation at compile time, a hardware pipeline architecture that, at run-time, can perform user-specified functions using the FPGA 265. The development environment 405 also includes a HLL compiler 415. The HLL compiler 415 connects with the HLL program 410 and a database 420. In this depicted example, the database includes user libraries 420a, which may define data structures associated with editor circuitry, may further include HLL libraries 420b. The HLL compiler 415 may select available library files in the database 420 to compile HLL commands into one or more sets of instructions, which may also be referred to as data structures. During development, the sets of instructions are stored in a data store or NVM 425 (non-volatile memory).

The configuration system 400A also includes an implementation environment 430. An implementation engineer may employ some compiler tools to convert the instructions stored in the NVM 425 into hardware/software implementations 430a (e.g., RTL (register transfer logic)) that can be loaded via a bitstream, for example, into a target device such as the FPGA 265, for example. In some embodiments, the implementation environment 430 may generate the data to realize fixed hardware (e.g., in an ASIC) in accordance with the design specified by, for example, the user-input high level language programming in the development environment 405.

The configuration system 400A also includes a hardware environment 440. The hardware environment 440 may include a line card. In some embodiments, the hardware environment 440 may include a network interface card (NIC). In this depicted example, the hardware environment 440 includes a number of buffers 445a (e.g., which may form the I/O interface 245) that connect external signals into an FPGA (e.g., the FPGA 265). In the depicted example, the FPGA 265 includes various programmable logic blocks that represent programmable hardware resources available to realize circuitry in accordance with the design specified by, for example, the user-input high level language programming in the development environment 405. The FPGA 265 also connects with other devices 445b.

FIG. 4B depicts a particularized system configured to compile match-action instructions as specified in a high-level language to configure circuitry for packet match-action processing. A configuration system 400B includes the development environment 405 for design development using the HLL program 410. A user can use an HLL (e.g., P4 language) to generate, at design time, instructions that can produce, via RTL generation at compile time, a hardware pipeline architecture that, at run-time, can perform match-action processing on a stream of packets using an integrated circuit (IC), such as the FPGA 265. In this depicted example, the database 420 includes one or more editor circuit libraries in the user libraries 420a, and one or more P4 libraries in the HLL libraries 420b.

The FPGA 265 can be configured to implement a data packet processing circuit (e.g., the DPPC 270). The DPPC 270 includes the parser 310, the match-action pipeline 320, and the deparser 330. A user can use the HLL to define information on what operations are required and what rules should be applied with regard to match-action processing of packets. The HLL can specify match tables having key values and associated responses, conditions that control whether or not key values are looked-up, and actions that are responsive to the responses output by the match tables.

With reference to FIG. 3, some embodiments of the DPPC 270 may operate the parser 310, for example, to identify the different types of packet headers present in a data packet. In an illustrative example, match-action operations may be a function of the header sequencing and/or field values extracted by the parser 310. The match-action pipeline 320 can operate with a lookup table to perform a lookup of a destination address extracted from a packet header. If a match is found in the lookup table, a corresponding action circuit of the match-action pipeline may be enabled to perform a corresponding operation.

In some applications of the disclosed approaches, a user using the HLL at design time and operating in the development environment 405 may specify how headers are to be modified, for example. The specified header modification may include insertion, updating and/or removal of one or more headers or header fields in a packet. A processor may determine whether the hardware editor circuit 340 is configured to perform the required packet deparsing operations more efficiently than the CPU or other available processor systems. For example, efficiency may be improved if the deparsing function can be offloaded from the processor to the streaming hardware pipeline architecture of the editor circuit 340, for example, which may advantageously achieve better utilization of programmable logic resources, reduce computational load, power and/or latency, or otherwise optimize use of available computational resources. In some implementations, efficiency may be improved when latency can be reduced by offloading from memory intensive, processor-based software control to streaming hardware-accelerated embodiments adapted to perform deparsing operations using the editor circuit 340.

An exemplary match-action circuit can be implemented as match-action pipeline 320. The match-action circuit can include one or more conditional logic circuits 462, one or more match circuits 464, and one or more action circuits 466 coupled in a pipelined arrangement. The header and metadata selected by the parser 310 are provided to the conditional logic circuit(s) 462 in an input register. Each conditional logic circuit has a respective input coupled to the input register and is configured to generate a respective enable signal as a logic function of the states of one or more signals from the input register.

Each match circuit 464 is configured with a respective set of key values and associated response values. Each key value has one or more associated response values. Each match circuit is configured to conditionally lookup the response value(s) associated with an input key value from the input register in response to a state of the respective enable signal from of the conditional logic circuit(s). Each match circuit outputs the response value(s) associated with the input key value, if the input key value matches a key value stored in the match circuit.

Each action circuit 466 receives one or more response values from the match circuit(s). Each action circuit is configured to conditionally modify, in response to states of the received response value(s), data of at least one of the header or the metadata. The modified data is output for storage in the output register.

Figure 5:
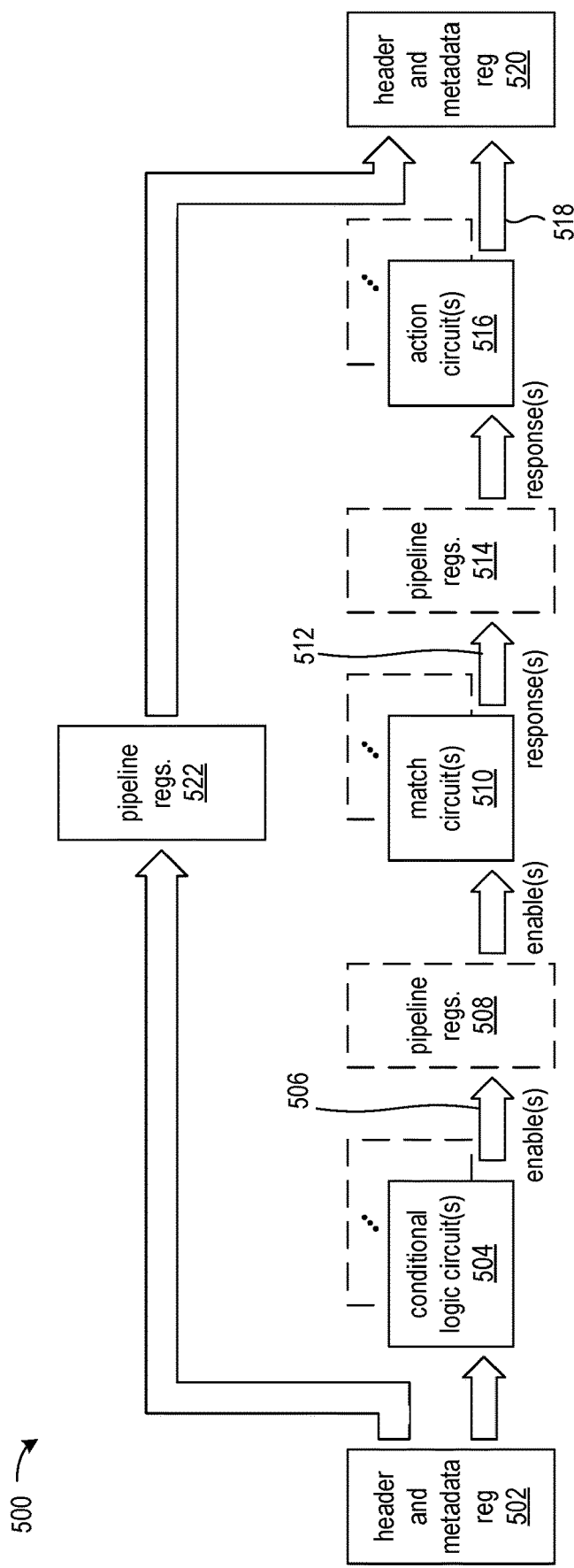
FIG. 5 shows circuitry and data flow of exemplary pipelined match-action circuitry.

FIG. 5 shows circuitry and data flow of exemplary pipelined match-action circuitry 500. The exemplary pipelined match-action circuitry includes an input register 502, one or more conditional logic circuits 504, optional pipeline registers 508, one or more match circuits 510, optional pipeline registers 514, one or more action circuits 516, output register 520, and pipeline registers 522. As will be seen in subsequent FIGs., the match-action circuitry can have multiple data paths, with the conditional logic circuit(s), match circuit(s), and action circuit(s) connected in a tree-based data flow. The number of pipeline stages and structure of the multiple data paths will depend on the match-action packet processing requirements set forth in the HLL specification.

The input register 502 stores header and metadata extracted by the parser 310 (FIG. 4B). Selected ones of the signals from the input register 502 can be connected to inputs of one or more of the conditional logic circuit(s) 504. Though the exemplary match-action circuitry 500 includes one or more conditional logic circuit(s), other exemplary match-action circuitry may not have any conditional logic circuit(s), depending on the match-action packet processing requirements specified in the HLL specification. The conditional logic circuit(s) can be used to enable/disable searches by the match circuit(s) 510. A conditional logic circuit can be implemented as combinatorial/sequential logic performing operations ranging from bit checks to evaluation of complex Boolean expressions. The inputs to the conditional logic circuit(s) can be signals based on the header and metadata from the input register, an output signal from another conditional logic circuit, or the output of one of the action circuit(s) 516.

In match-action circuitry 500 having multiple conditional logic circuits 504 having unequal latencies, one or more pipeline registers 508 can be coupled between the conditional logic circuit(s) and the match circuit(s) (or between conditional logic circuit(s)). The pipeline registers 508 can store the states of output signals 506 from the conditional logic circuits in order to delay the signal for input to the next circuit (conditional logic or match circuit) at the appropriate stage of the pipeline.

Each match circuit 510 is configured with a respective set of key values and associated response values. Each key value can have one or more associated response values. A signal from one of the conditional logic circuits 504 can be used to enable a match circuit, and the match circuit can lookup one or more response values associated with an input key value from the input register. Along with a response value(s), a match circuit can also output a hit-miss signal indicating whether the input key value was matched.

In match-action circuitry 500 having multiple match circuits 510 having unequal latencies, one or more pipeline registers 514 can be coupled between the match circuit(s) and the action circuit(s) 516. The pipeline registers 514 can store the states of response signals 512 from the match circuits in order to delay the response signals for input to the action circuit(s) at the appropriate stage of the pipeline.

Each of the action circuit(s) 516 is coupled to input response signals from one of the match circuit(s) 510. An action circuit can also input signals from another one of the action circuit(s). An action circuit can conditionally modify, in response to states of the received one or more response values, data of the header and/or metadata. A modification of the header and/or metadata can be conditioned on and/or based on the value of the response signals from the match circuit(s) 510). The output from an action circuit can be stored as modified header/metadata 518 in the output register 520. The output from an action circuit, depending on the HLL specification of the match-action circuitry 500, can also be provided as input to a conditional logic circuit 504, to a match circuit 510, or to another action circuit. For action circuits having unequal latencies, pipeline circuits (not shown) can be coupled to delay output signals from the action circuits accordingly.

As the modified header/metadata stored in the output register 520 can be provided from only one of the action circuit(s) 516, a selection circuit (e.g., selection circuit 616, FIG. 9) can be coupled between the action circuit(s) and the register 520. The control input of the selection circuit can be connected to an enable output signal(s) (not shown) from the action circuit(s).

Pipeline registers 522 are coupled between the input register 502 and the output register 520 to delay header and/or metadata that is not modified by the action circuit(s) 516. The number of pipeline registers is dependent on the overall latency of the conditional logic circuit(s) 504, match circuit(s) 512, and action circuit(s) 516. The pipeline registers 522 ensure that the unmodified data arrives at the output register at the same time that the modified header/metadata.

FIGS. 6, 7, and 8 show the input signals and output signals of a conditional logic circuit 552, match circuit 554, and action circuit 556, respectively. The diagrams illustrate the circuit building blocks that can be used in building pipelined match-action circuitry. A pipeline control circuit (not shown) can generate the valid_in signals to the conditional logic circuit, match circuit, and action circuit to enable the circuits at the appropriate times.

FIG. 6 shows the input signals to and the output signals from a conditional logic circuit 552. Conditional blocks are optional in match-action circuitry, and the particular function and circuitry depend on the HLL specification of the match-action circuitry. A conditional logic circuit can enable/disable searches of tables by match circuits if required by the application and can be implemented as combinatorial/sequential logic. The logic can range from performing simple bit checks to complex bit-wise operations to evaluating Boolean expressions. The latency between different conditional logic circuits can vary from single to multiple clock cycles. In the exemplary approaches described herein, the throughput of a conditional logic circuit is expected to be one clock cycle, which can be accomplished with appropriate pipeline scheduling of components of the match-action circuitry.

The expected input signals to a conditional logic circuit include a valid_in signal and one or more input data signals. All of the input data signals are provided at the same time while the valid_in input signal is held in a steady state for a single clock cycle. The input signal(s) to a conditional logic circuit can be from a header and metadata input register, another conditional logic circuit, or from an action circuit. The output signals from each conditional logic circuit include the enable_out signal, which indicates whether the condition evaluated to true or false in response to the data input signals, and the valid_out signal that is held steady for a single clock cycle concurrent with the enable_out signal.

FIG. 7 shows the input signals to and the output signals from a match circuit 554. The match circuit can be configured with multiple keys 558 and associated responses 560. Each key can have one or more associated responses, and each key can have a unique set of responses. A set of responses is the data output by the match circuit in the case of a match for the searched key. The response can trigger different action circuits and/or be used as input data to an action circuit.

The match circuit can include a content addressable memory (CAM) that stores the keys and associated responses. The CAM can be a binary CAM or ternary CAM, or another type of lookup circuit, depending on application requirements. The latency between different match circuits can vary from single to multiple clock cycles. In the exemplary approaches described herein, the throughput of a match circuit is expected to be one clock cycle, which can be accomplished with appropriate pipeline scheduling of components of the match-action circuitry.

The expected input signals to a match circuit include a valid_in signal and one or more key signals. The valid_in signal can be asserted for a single clock cycle, during which the match circuit can input the key signals. The valid_in signal can be the valid_out signal from a conditional logic circuit, for example. The match circuit looks-up the value of the input key signal(s) in the CAM. The key signal(s) can come from either the input register having the header and metadata of a packet or from an action circuit.

The output signals from the match circuit 554 include a hit_miss signal, a valid_out signal, and one or more response signals. The hit_miss signal indicates whether or not the value of the input key signal(s) was found in the CAM. The response signal(s) represent the value(s) associated with a key value that matches the input key signal(s). The match circuit holds the valid_out signal steady for one clock cycle to indicate the response signal(s) are in a valid state to be input by an action circuit.

Configuration control and data signals can be input to a memory mapped interface (not shown) of the match circuit. A memory mapped interface, such as AXI FULL or AXI LITE, can be used to program the CAM with keys and associated responses.

FIG. 8 shows the input signals to and the output signals from an action circuit 556. An action circuit can be implemented as combinatorial/sequential logic, and the latency of different action circuits can vary from a single to multiple clock cycles. The throughput of an action circuit is expected to be one clock cycle, which can be accomplished with appropriate pipeline scheduling of components of the match-action circuitry. The functions of different action circuits can include performing bit-wise operations, arithmetic operations, and assignments.

The input signals to an action circuit include a valid_in signal and one or more input data signals. All of the input data signals are provided at the same time while the valid_in input signal is held in a steady state for a single clock cycle. The input data signals can encompass a response value(s) from a match circuit 554 or one or more data signals output from another action circuit.

The output signals from an action circuit include a valid_out signal and one or more data_out signals. The action circuit holds the valid_out signal steady for one clock cycle to indicate the data_out signal(s) is in a valid state. The data_out signal(s) can be provided to update the match-action output register or as input to another action circuit.

Figure 9:
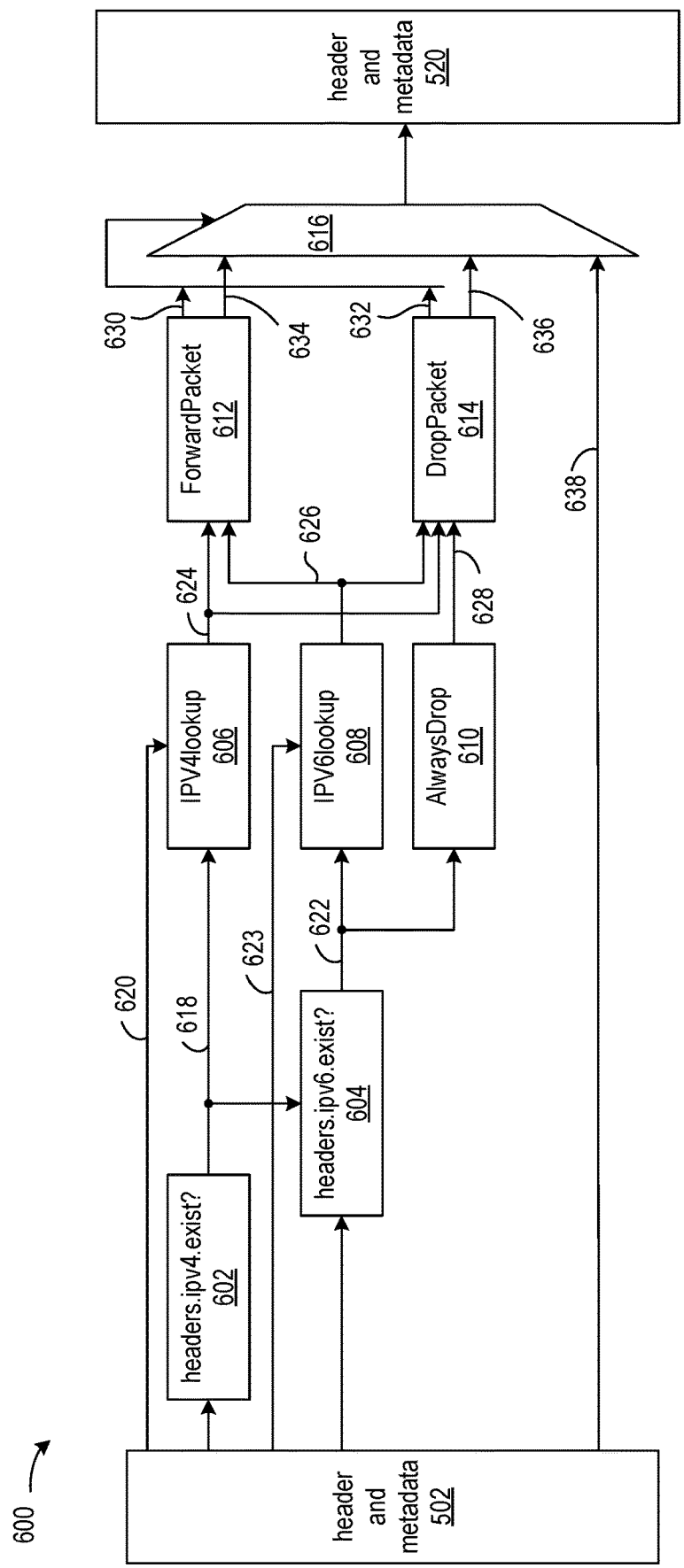
FIG. 9 shows an exemplary match-action circuit that implements a pseudo-code specification.

FIG. 9 shows an exemplary match-action circuit 600 that implements the pseudo-code specification shown in Example 1 below. Pipeline registers may be used to buffer and delay states but are omitted to simply the explanation.

```
action ForwardPacket(int port)
   metadata.port ← port
end action
action DropPacket( )
   metadata.port ← null
end action
table IPv4Lookup(int key1, int key2)
   if (table.hit) do
      ForwardPacket(table.response)
   else
      DropPacket( )
   end if
end table
table IPv6Lookup(long int key1, long int key2)
   if (table.hit) do
      ForwardPacket(table.response)
   else
      DropPacket( )
   end if
end table
table AlwaysDrop( )
   // always
      DropPacket( )
end table
processing myMAblock(inout headers, inout metadata)
   if (headers.ipv4.exists) do
      IPv4Lookup(headers.ipv4.source_addr, headers.ipv4.dest_addr)
   else if (headers.ipv6.exists) do
      IPv6Lookup(headers.ipv6.source_addr, headers.ipv6.dest_addr)
   else do
      AlwaysDrop( )
   end if
end processing
```

EXAMPLE 1

The pseudo-code specifies conditions, match tables, and actions associated with packet processing of Internet Protocol version 4 and version 6 ("IPv4" and "IPv6") packets. Packets are forwarded to a specific port number or dropped based on the source address and destination address present in the packet. Responses for setting the port number to which a packet can be redirected are stored as responses in association with key values in the table (e.g., a CAM) of a match circuit. The key values in the table are derived from expected source and destination addresses. Any packet that is not an IPv4 packet or IPv6 packet is forwarded to the "null" port, and thereby dropped.

The actions ForwardPacket and DropPacket update the port field in the output metadata. The match circuits are specified as tables IPv4Lookup and IPv6Lookup. The IPv4Lookup and IPv6Lookup tables can trigger either the ForwardPacket or the DropPacket action. The AlwaysDrop table can trigger only the DropPacket action.

Only one of the IPv4Lookup and IPv6Lookup tables is enabled to lookup the input key value, and the one of IPv4Lookup and IPv6Lookup tables that is enabled depends on the IP version indicated in the received packet. The selection is made by the if-then-else pseudocode in the myMAblock block of code. The pseudocode within each of the IPv4Lookup and IPv6Lookup section that controls whether the ForwardPacket or DropPacket action is enabled can be implemented using the hit-miss signal of the match circuit. The state of the hit_miss signal indicates whether the input key values matched an entry in the table/CAM.

The elements of the exemplary match-action circuit 600 implement the conditions, tables, and actions specified in the pseudocode of Example 1. The elements include conditional logic circuits headers.ipv4.exist? 602 and headers.ipv6.exist? 604; match circuits IPV4lookup 606 and AlwaysDrop 608; and action circuits ForwardPacket 612 and DropPacket 614. The exemplary match-action circuit further includes input register 502, output register 520, and selection circuit 616. The connections between the elements implement the control and data flow specified in the pseudocode of Example 1.

The headers.ipv4.exist? and headers.ipv6.exist? circuits are based on 1-bit signal flags from the parser 310 (FIG. 4B) that indicate whether an IPv4 or an IPv6 is present in the packet. The conditional logic circuits are implemented because of the if-elseif-else statements that the values of the flags. The header existence flags are used as inputs to the conditionals.

The headers.ipv4.exist? circuit 602 outputs enable_out signal 618 having a state that indicates whether or not the IPv4 packet header is present in the input register. The enable_out signal 618 is input to headers.ipv6.exist? circuit 604 and to the IPV4lookup circuit 606. In response to the state of the enable_out signal 618 indicating that the IPv4 packet header is present in the input register, the IPV4lookup circuit is activated to lookup the key value on signal line 620. In response to the state of the enable_out signal 618 indicating that the IPv4 packet header is not present in the input register, the IPV4lookup circuit is not activated and the headers.ipv6.exist? circuit is activated to indicate whether or not an IPv6 packet header was detected by the parser 310 (FIG. 4B).

The headers.ipv6.exist? circuit 604 outputs enable_out signal 622 having a state that indicates whether or not the IPv6 packet header was found in the packet. The enable_out signal 622 is input to the IPV6lookup circuit 608 and to the AlwaysDrop circuit 610. In response to the state of the enable_out signal 622 indicating that the IPv6 packet header is present in the input register, the IPV6lookup circuit is activated to lookup the key value on signal line 623. Otherwise, the AlwaysDrop circuit 610 is activated.

The AlwaysDrop match circuit 610 can be implemented as a dummy match circuit. Because conditional logic circuits cannot trigger action circuits directly, the enable_out signal is routed through a dummy match circuit. The dummy match circuit directly wires the key input to the response output, which triggers the DropPacket action circuit 614. The dummy match circuit has no key-response pair, as no match operation is needed, the response is the input key, and can only have a single action associated.

The ForwardPacket action circuit inputs the hit_miss signals and response signals on signal lines 624 and 626 from the IPV4lookup and IPV6lookup circuits 606 and 608, respectively. The DropPacket action circuit 614 inputs the hit_miss signals on lines 624, 626, and 628 from the IPV4lookup, IPV6lookup, and AlwaysDrop match circuits 606, 608, and 610, respectively. The updated metadata from the ForwardPacket and DropPacket action circuits are input to the selector circuit 616. The selector circuit can be controlled by the valid_out signals 630 and 632 (also FIG. 8) from the ForwardPacket and DropPacket action circuits. The selector circuit can select one of the data_out 634 from the ForwardPacket circuit, the data_out 636 from the DropPacket circuit, or unmodified data 638 from the input register 502. The selected data is stored in the proper positions in the output register 520.

To avoid inefficiencies associated with a circuit implementation that follows a strictly sequential flow specified in the pseudocode, the development environment 405, HLL compiler 415, and implementation environment 430 (FIGS. 4A, 4B) produce a pipelined match-action circuit that supports parallel operation of the conditional logic circuits, match circuits, and action circuits.

Figure 10:
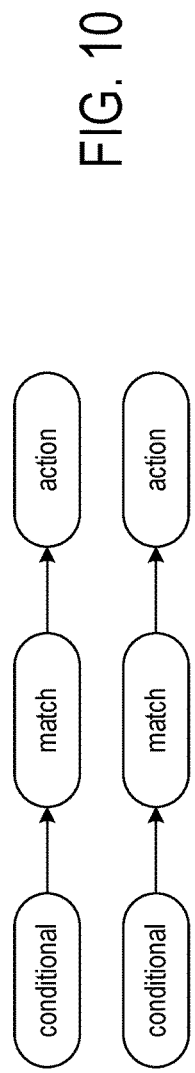
FIG. 10 shows no dependencies between match-action components.

The disclosed approaches analyze dependencies between components of match-action circuitry involving multiple conditional logic circuits, multiple match circuits, and multiple action circuits in order to produce a pipelined structure that minimizes latency while maximizing parallelization to produce output on every clock cycle. FIGS. 10-14 illustrate the possible dependencies between components of match-action circuitry. In FIG. 10, there is no dependency between the components in two match-action paths and the paths can be executed in parallel.

Figure 11:
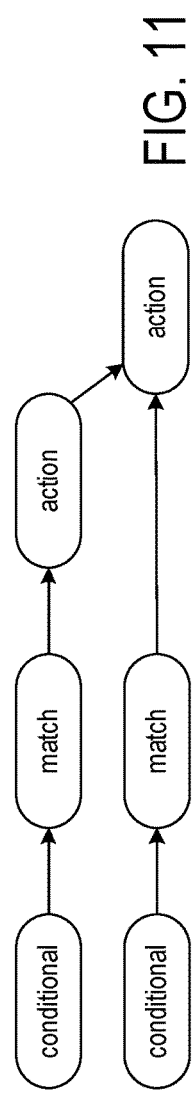
FIG. 11 shows an action-to-action dependency in which one action depends on the output of another action.

FIG. 11 shows an action-to-action dependency in which one action depends on the output of another action. That is, the output of one action is input to another action.

Figure 12:
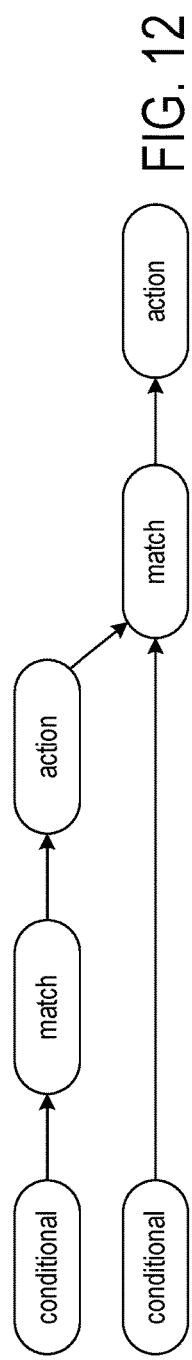
FIG. 12 shows an action-to-match dependency in which a match circuit depends on the output of an action circuit.

FIG. 12 shows an action-to-match dependency in which a match circuit depends on the output of an action circuit. The output of an action circuit is the key input to a match circuit.

Figure 13:
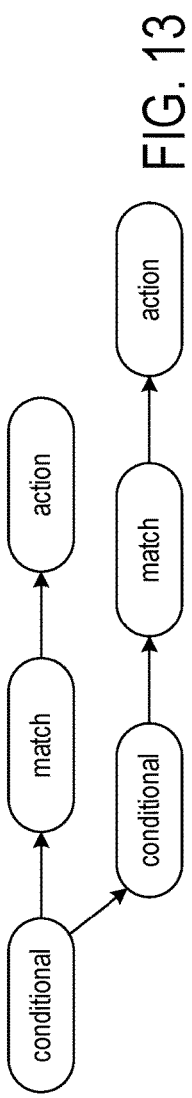
FIG. 13 shows a condition-to-condition dependency, which results from if-elseif . . . in the HLL specification of the match-action circuitry.

FIG. 13 shows a condition-to-condition dependency, which results from if-elseif . . . in the HLL specification of the match-action circuitry.

Figure 14:
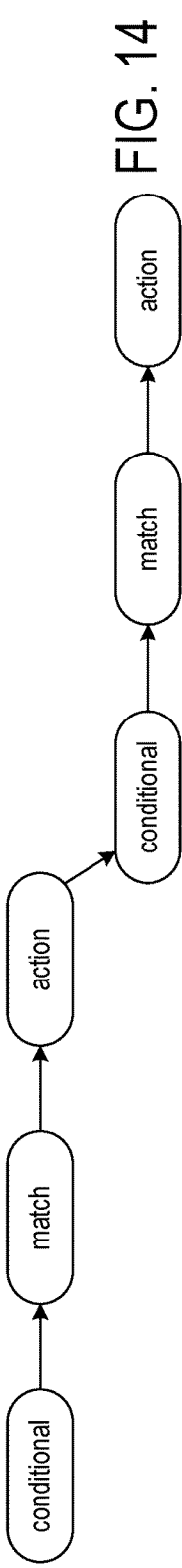
FIG. 14 shows an action-to-conditional dependency.

FIG. 14 shows an action-to-conditional dependency. The output of an action is used as an input to a conditional.

The HLL compiler 415 (FIG. 4B) and implementation tools evaluate the dependencies between components and the latencies of those components needed to implement a match-action circuit in order to produce a parallel implementation that maximizes throughput. The dependencies and latencies of each circuit component are used to determine a suitable number of pipeline stages and to assign the components to a stage of the pipeline. Signals between components and signals within components can be registered and delayed to schedule the operations of the components.

Figure 15:
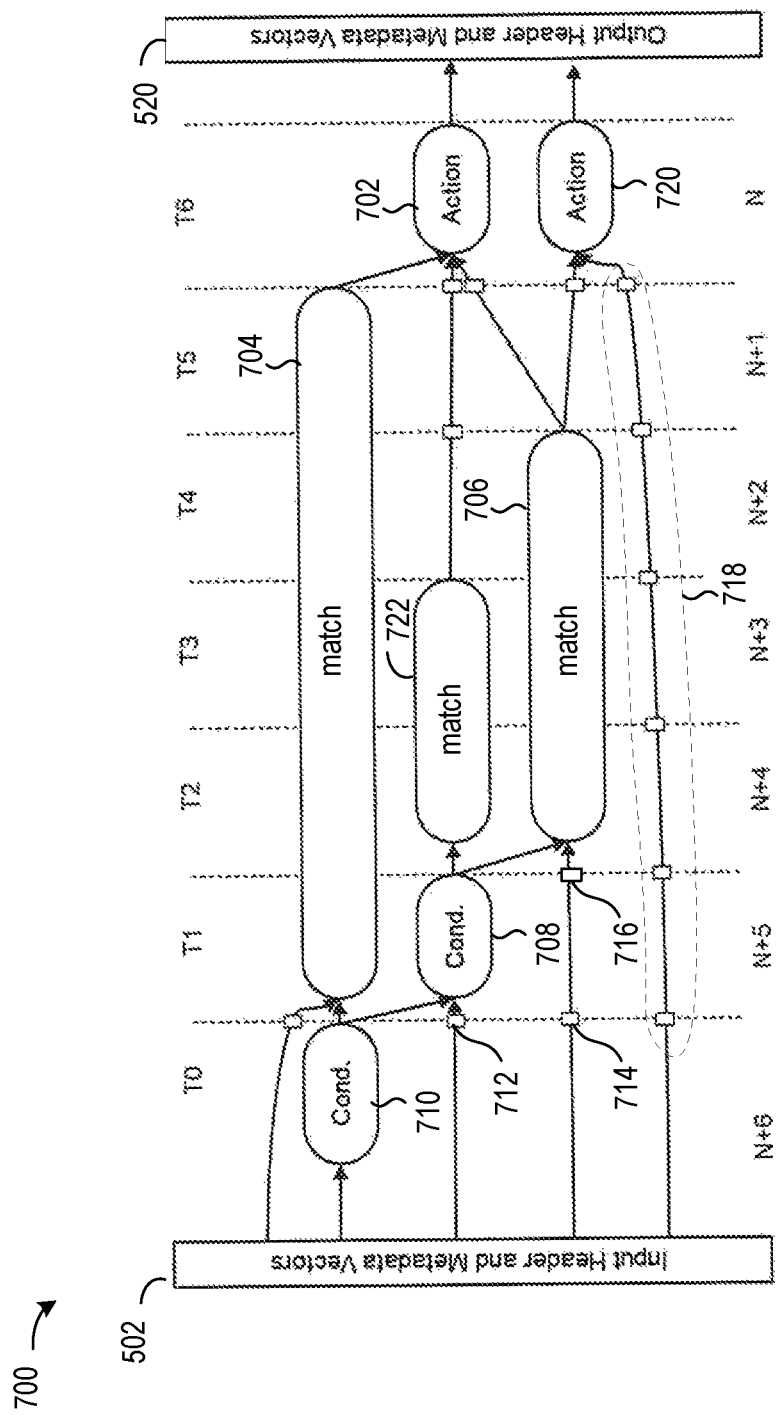
FIG. 15 shows a timing graph of the components of an exemplary match-action circuit as assigned to stages of a pipeline.

FIG. 15 shows a timing graph 700 of the components of an exemplary match-action circuit as assigned to stages of a pipeline. Note that the timing graph 700 does not represent the pseudo-code of Example 1, though there may be similarities to the structure of FIG. 8. The columns correspond to 7 clock cycles, denoted T0-T6. The components in each stage of the pipeline can be active at the same time and processing information of different packets. For example, while action circuit 702 is processing data related to packet N, match circuit 704 can be processing data related to packet N+1 in stage T5, match circuit 706 can be processing data related to packet N+2 in stage T4, etc.

The timing graph illustrates the assignment of components of the match-action circuit to stages of the pipeline based on dependencies between and latencies of the components. The timing graph also illustrates pipeline registers used to delay signals for input to the components. Conditional logic circuit 708 depends on output from conditional logic circuit 710 and is assigned to stage T1, which follows stage T0. Pipeline register 712 is inserted to delay the signal(s) from the input register 502 to the conditional logic circuit 708 until stage T1, at which time the output from conditional logic circuit 710 is also available. Similarly, match circuit 706 is assigned to begin in stage T2 as match circuit 706 depends on the output from conditional logic circuit 708. Pipeline registers 714 and 716 delay signals from the input register 502 to the match circuit 706 until stage T2 at which time the output from the conditional logic circuit 708 is valid. Pipeline registers 718 delay signals from the input register for input to the action circuit 720.

As match circuits 704, 706, and 722 have different latencies, pipeline registers can be coupled between the match circuits and the action circuits 702 and 720. Though not shown, one or more pipeline registers can also be coupled between either of the action circuits 702 and 720 and the output register 520 if the action circuits had different latencies. Also not shown, one or more pipeline registers can be coupled between either of conditional logic circuits 708 and 710 and the match circuit 704 and 708 for unequal latencies, and/or between the input register 502 and the output register 520 to pipeline unmodified header/metadata.

Figure 16:
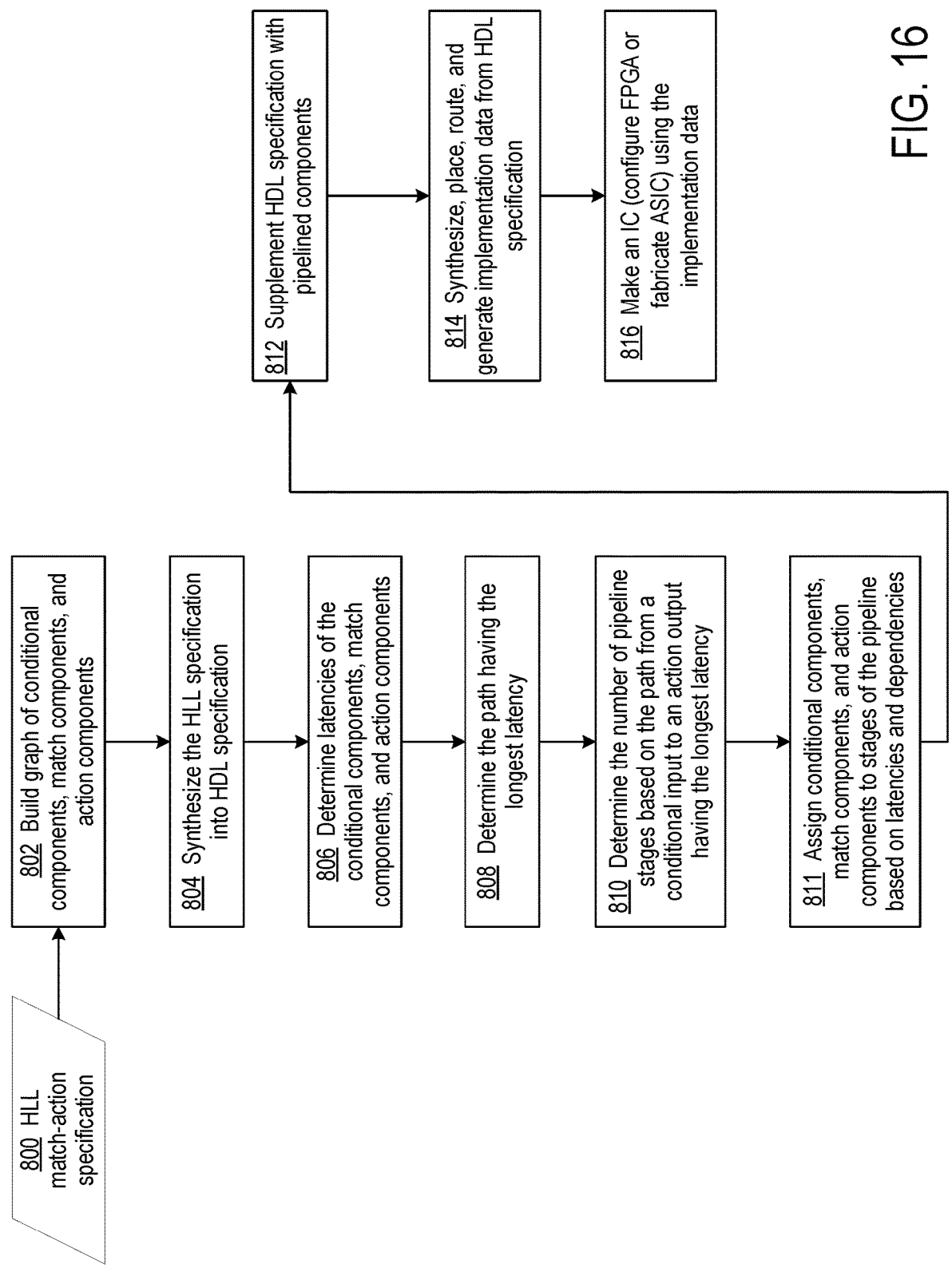
FIG. 16 is a flowchart of an exemplary process of implementing a pipelined match-action circuit.

FIG. 16 is a flowchart of an exemplary process of implementing a pipelined match-action circuit. An HLL match-action specification 800 is input to an HLL compiler executing on a computer system, and at block 802, the HLL compiler builds a dataflow graph from the HLL specification. The dataflow graph represents dependencies between the conditional logic components, match components, and action components set forth in the HLL specification. Example 1 above shows HLL pseudocode corresponding to HLL code from which a dataflow graph can be constructed. FIGS. 10-14 illustrate the types of dependencies that can be represented in the dataflow graph.

At block 804, the HLL compiler synthesizes the HLL specification into a hardware description language (HDL) specification using high-level synthesis techniques. At block 806, the HLL compiler determines latencies of the HDL-specified conditional logic components, match components, and action components. Behavioral models or model algorithms can be used to calculate latencies of the components. Alternatively, latencies can be pre-calculated values stored in an internal database for all possible configurations, and the pre-calculated values used during processing of the circuit design.

At block 808, the HLL compiler determines the path having the longest latency from the latencies of the conditional logic, match, and action components in each path. Referring to the example of FIG. 9, one path includes header.ip4.exist? 604, IPV4 lookup 606, and ForwardPacket 612; another path includes headers.ipv4exist? 602, headers.ipv6.exist?, IPV6lookup 608, and ForwardPacket 612; another paths includes header.ip4.exist? 604, IPV4 lookup 606, and DropPacket 614; another path includes headers.ipv4exist? 602, headers.ipv6.exist?, IPV6lookup 608, and DropPacket 614; and another path includes headers.ipv4exist? 602, headers.ipv6.exist?, AlwaysDrop 610, and DropPacket 614. The latency of a path can be the sum of the latencies of the components on the path.

At block 810, the HLL compiler determines the number of pipeline stages for the match-action circuit based on the path having the longest latency. In the example of FIG. 15, the path having the longest latency is the path through conditional logic circuit 710, match circuit 704, and action circuit 702. Based on the determined number of pipeline stages, latencies, and data input and output dependencies, at block 811 the HLL compiler assigns the conditional components, match components, and action components to stages of the pipeline. The components can be scheduled using an as soon as possible approach in which a component is scheduled in the earliest stage of the pipeline as the latency and dependencies permit. The as soon as possible scheduling can significantly reduce pipeline resources. After all components have been assigned to pipeline stages, inter-component signals are registered, pipelined and delayed as many clock cycles as required. For example, as shown in FIG. 15, the outputs of match component 722 are registered twice (delayed by 2 clock cycles) before connecting to the input of action component 702. This is required so all the inputs to the action component arrive in the same clock cycle. Similar registering of signals can be added for connections from and to the header and metadata interfaces. At block 812 the HLL compiler supplements the HDL specification with the pipelined components, for example instantiations of pipeline registers and pipeline control circuitry.

At block 814, the implementation tools 430a (FIG. 4B) synthesize, place, route, and generate implementation data from the supplemented HDL specification. The implementation data can be targeted to configuring programmable logic of an FPGA or to fabricating an application specific integrated circuit (ASIC). At block 816, a circuit can be implemented by way of configuring a programmable IC with the implementation data or fabricating, making, or producing an ASIC from the implementation data, thereby creating a circuit that operates according to the resulting circuit design.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for packet processing. Other aspects and features will be apparent to those skilled in the art from consideration of the specification. The methods and system may be implemented as multiple processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A circuit arrangement, comprising:
   an input register configured for storage of a header and metadata of a network packet;
   an output register;
   one or more conditional logic circuits, each conditional logic circuit having a respective input coupled to the input register and having a respective output, and each conditional logic circuit configured to generate a respective enable signal as a logic function of states of one or more signals that indicate the header and metadata from the input register;
   one or more match circuits, each match circuit configured with a respective set of a plurality of key values and associated response values, each key value having one or more associated response values, wherein each match circuit is configured to:
      conditionally lookup the one or more response values associated with an input key value from the input register in response to a state of the respective enable signal from one of the one or more conditional logic circuits; and
      output the one or more response values associated with the input key value;
   a plurality of action circuits coupled to the output register and two or more of the action circuits having unequal latencies, each action circuit coupled to receive one or more of the one or more response values from the one or more match circuits, and configured to conditionally modify, in response to states of the received one or more response values, data of at least one of the header or the metadata, and to output the modified data for storage in the output register; and
   one or more pipeline registers coupled between one of the two or more action circuits and the output register for storage of the modified data of the at least one of the header or metadata.

2. The circuit arrangement of claim 1, further comprising one or more pipeline registers coupled between the input register and one of the one or more conditional logic circuits and configured to delay the one or more signals from the input register to the one conditional logic circuit.

3. The circuit arrangement of claim 1, further comprising one or more pipeline registers coupled between the input register and one of the one or more match circuits and configured to delay the input key value from the input register to the one match circuit.

4. The circuit arrangement of claim 1, further comprising one or more pipeline registers coupled between the input register and one of the one or more action circuits and configured to delay the data of at least one of the header or the metadata from the input register to the one action circuit.

5. The circuit arrangement of claim 1, wherein the one or more conditional logic circuits is a plurality of conditional logic circuits and two or more of the conditional logic circuits have unequal latencies, and the circuit arrangement further comprises one or more pipeline registers coupled between one of the two or more conditional logic circuits and one or more of the one or more match circuits for storage of state of the respective enable signal.

6. The circuit arrangement of claim 1, wherein the one or more match circuits is a plurality of match circuits and two or more of the match circuits have unequal latencies, and the circuit arrangement further comprises one or more pipeline registers coupled between one of the two or more match circuits and one or more of the one or more action circuits for storage of the one or more response values associated with the input key value.

7. The circuit arrangement of claim 1, wherein the one or more action circuits is a plurality of action circuits and the circuit arrangement further comprising a selection circuit coupled to receive the modified data from two or more of the plurality of action circuits, the selection circuit configured to select between the modified data from the two or more of the plurality of action circuits for storage in the output register.

8. The circuit arrangement of claim 1, wherein:
each conditional logic circuit is configured to generate a first valid-output signal to one or more of the one or more match circuits, wherein the first valid-output signal indicates that the respective enable signal is valid;
each match circuit is configured to generate a second valid-output signal to one or more of the one or more action circuits, wherein the second valid-output signal indicates that the one or more response values are valid; and
each action circuit is configured to generate a third valid-output signal, wherein the third valid-output signal indicates that output from the action circuit is valid.

9. A circuit arrangement comprising:
an input register configured for storage of a header and metadata of a network packet;
an output register;
a match circuit configured with a plurality of key values and associated response values, each key value having one or more associated response values, and the match circuit configured to lookup, in response to an input key value from the input register, the one or more response values associated with the input key value and to output the one or more response values associated with the input key value; and
a plurality of action circuits coupled to the output register and to the match circuit to receive in parallel the one or more response values associated with the input key value, wherein two or more of the action circuits of the plurality of action circuits have unequal latencies and each action circuit is configured to conditionally modify, in response to states of the received one or more response values, data of at least one of the header or the metadata, and to output the modified data for storage in the output register; and one or more pipeline registers coupled between one of the two or more action circuits and the output register for storage of the modified data of the header or metadata.

10. The circuit arrangement of claim 9, further comprising:
a plurality of match circuits, wherein the plurality of match circuits includes the match circuit, and two or more of the plurality of match circuits have unequal latencies; and
one or more pipeline registers coupled between one of the two or more match circuits and the plurality of action circuits for storage of the one or more response values output by the one of the at least two match circuits.

11. The circuit arrangement of claim 10, further comprising one or more pipeline registers coupled between the input register and one of the match circuits and configured to delay the input key value from the input register to the one match circuit.

12. The circuit arrangement of claim 9, further comprising:
a plurality of match circuits, wherein the plurality of match circuits includes the match circuit; and
a plurality of conditional logic circuits having respective inputs coupled to the input register, and each conditional logic circuit having a respective output coupled to one or more of the plurality of match circuits, wherein:
each conditional logic circuit is configured to generate a respective enable signal as a logic function of states of one or more signals from the input register; and
one or more circuits of the plurality of match circuits is configured to input the enable signal and condition the lookup in response to a state of the enable signal.

13. The circuit arrangement of claim 12, wherein two or more of the conditional logic circuits have unequal latencies, and the circuit arrangement further comprises one or more pipeline registers coupled between one of the plurality of conditional logic circuits and one or more of the plurality of match circuits for storage of state the respective enable signal.

14. The circuit arrangement of claim 12, further comprising one or more pipeline registers coupled between the input register and one of the conditional logic circuits and configured to delay the one or more signals from the input register to the one conditional logic circuit.

15. The circuit arrangement of claim 9, wherein:
the match circuit is further configured to generate a hit-or-miss signal having a state indicative of presence or absence of the input key value;
the plurality of action circuits is coupled to receive the hit-or-miss signal, and the conditional modification by each action circuit is further responsive to the state of the hit-or-miss signal; and
one action circuit of the plurality of action circuits is configured to perform a default action in response to the state of the hit-or-miss signal indicating a miss.

16. The circuit arrangement of claim 9, further comprising one or more pipeline registers coupled between the input register and one of the action circuits and configured to delay the data of at least one of the header or the metadata from the input register to the one action circuit.

\* \* \* \* \*